(12) United States Patent
Takemoto et al.

(10) Patent No.: US 10,373,721 B2
(45) Date of Patent: Aug. 6, 2019

(54) DEVICE FOR AND METHOD OF RECONSTRUCTING AXIAL MEASUREMENT VALUES IN NUCLEAR FUEL

(71) Applicant: MITSUBISHI HEAVY INDUSTRIES, LTD., Tokyo (JP)

(72) Inventors: Yuki Takemoto, Tokyo (JP); Kazuki Kirimura, Tokyo (JP); Shinya Kosaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 351 days.

(21) Appl. No.: 15/104,487

(22) PCT Filed: Sep. 4, 2015

(86) PCT No.: PCT/JP2015/075206
§ 371 (c)(1),
(2) Date: Jun. 14, 2016

(87) PCT Pub. No.: WO2016/203661
PCT Pub. Date: Dec. 22, 2016

(65) Prior Publication Data
US 2017/0200516 A1 Jul. 13, 2017

(30) Foreign Application Priority Data
Jun. 18, 2015 (JP) ................... 2015-123228

(51) Int. Cl.
*G21C 17/10* (2006.01)
*G21C 17/108* (2006.01)
(Continued)

(52) U.S. Cl.
CPC ........... *G21C 17/108* (2013.01); *G21C 17/10* (2013.01); *G21D 3/001* (2013.01); *G21D 3/10* (2013.01); *G21D 3/005* (2019.01); *Y02E 30/40* (2013.01)

(58) Field of Classification Search
CPC ............................. G21C 17/10; G21C 17/108
See application file for complete search history.

(56) References Cited

FOREIGN PATENT DOCUMENTS

| | | |
|---|---|---|
| JP | 56-138291 A | 10/1981 |
| JP | 58-35492 A | 3/1983 |

(Continued)

OTHER PUBLICATIONS

Takemoto, Yuki, et al. "ICONE23-1585: The Axial Reaction Rate Distribution Interpolation Method for FID Signals in MHI's Core Monitoring System Vision." The Proceedings of the International Conference on Nuclear Engineering (ICONE) 2015.23. The Japan Society of Mechanical Engineers, May 2015.*

(Continued)

*Primary Examiner* — Lily C Garner
(74) *Attorney, Agent, or Firm* — Westerman, Hattori, Daniels & Adrian, LLP

(57) ABSTRACT

In a device for and a method of reconstructing axial measurement values in a nuclear fuel, which is a device that calculates an axial reaction rate distribution by reconstructing a plurality of measurement values measured by a plurality of neutron flux detectors that are disposed at predetermined intervals in a fuel assembly along the axial direction of the fuel assembly, because a reconstruction parameter generator that generates a reconstruction parameter on the basis of core design data, or core analysis data, and a data adjustment factor; and an axial reaction rate distribution generator that calculates an axial reaction rate distribution on the basis of the measurement values that are (Continued)

measured by the neutron flux detectors and the reconstruction parameter that is generated by the reconstruction parameter generator are provided, an accurate axial measurement distribution in the nuclear fuel is obtained by reconstructing the measurement values.

4 Claims, 7 Drawing Sheets

(51) Int. Cl.
*G21D 3/00* (2006.01)
*G21D 3/10* (2006.01)

(56) References Cited

FOREIGN PATENT DOCUMENTS

| JP | 1-199195 A | | 8/1989 |
|----|------------|---|--------|
| JP | 01199195 A | * | 8/1989 |
| JP | 2005-241604 A | | 9/2005 |

OTHER PUBLICATIONS

Takemoto et al., "The Axial Reaction Rate Distribution Interpolation method for FID signals in MRI's Core Monitoring System VISION" The 23rd International Conference on Nuclear Engineering (1 page).
Written Opinion dated Nov. 24, 2015, issued in counterpart Application No. PCT/JP2015/075208, with English tranaltion (8 pages).
International Search Report dated Nov. 24, 2015, issued in counterpart International Application No. PCT/JP2015/075208 (3 page).

* cited by examiner

HEIGHT OF CORE

HEIGHT OF CORE

HEIGHT OF CORE

HEIGHT OF CORE

DEVICE FOR AND METHOD OF RECONSTRUCTING AXIAL MEASUREMENT VALUES IN NUCLEAR FUEL

FIELD

The present invention relates to a device for reconstructing axial measurement values in a nuclear fuel, which is a device that reconstructs values measured by detectors provided in the core of a nuclear reactor.

BACKGROUND

As a method of evaluating nuclear properties in the core of a nuclear reactor, there has been a method of comparing design values and actual values (measurement values) about items, such as the output peaking and the axial output deviation of the core. A neutron flux detector is provided in the core of the nuclear reactor and a distribution of reaction rates along the axial direction of the core is calculated on the basis of values measured by the neutron flux detector. By using a plurality of types of data, such as the distribution of reaction rates and the temperature along the axial direction of the core, reactor output distribution processing is regularly performed in order to monitor the core, and the output peaking and the axial output deviation of the core, etc. are calculated. Such methods are described in, for example, the following patent documents.

CITATION LIST

Patent Literature

Patent Literature 1: Japanese Laid-open Patent Publication No. 56-138291
Patent Literature 2: Japanese Laid-open Patent Publication No. 58-035492

SUMMARY

Technical Problem

As neutron flux detectors used in pressurized water reactors, there are mainly movable neutron flux detectors and fixed neutron flux detectors. As for movable neutron flux detector, because a movable neutron flux detector is inserted into an in-core nuclear instrumentation guide thimble and performs measurement while being moved in the longitudinal direction (in the direction along the height of a fuel assembly), it is possible to obtain continuous axial measurement distribution information on the nuclear fuel. On the other hand, as for fixed neutron flux detector, a plurality of fixed neutron flux detectors are disposed at predetermined intervals along the longitudinal direction in an in-core nuclear instrumentation guide thimble in a fuel assembly, it is possible to obtain a plurality of values of measurements at different levels in the fuel assembly by using the fixed neutron flux detectors, and it is thus possible to obtain an axial measurement distribution in the nuclear fuel by using the measurement values; however, the number of neutron flux detectors that can be disposed in an in-core nuclear instrumentation guide thimble in a fuel assembly is limited, which makes it difficult to obtain a detailed axial measurement distribution in the nuclear fuel. Because the neutron flux detectors are fixed in the in-core nuclear instrumentation guide thimble, it is not possible to replace a failed nuclear flux detector, which leads to a problem in that the number of measurement values decreases and this further lowers the accuracy of the axial measurement distribution in the nuclear fuel.

The present invention is for solving the above-described problem and an objective of the present invention is to provide a device for and a method of reconstructing axial measurement values in a nuclear fuel, which are a device and a method enabling obtaining of an accurate axial measurement distribution in a nuclear fuel by reconstructing a plurality of measurement values.

Solution to Problem

According to a device for reconstructing axial measurement values in a nuclear fuel of this invention, the device calculating an axial measurement distribution by reconstructing a plurality of measurement values measured by a plurality of detectors that are disposed at predetermined intervals in the nuclear fuel along the axial direction of the nuclear fuel. The device comprising a reconstruction parameter generator that generates a reconstruction parameter on the basis of core design data, or core analysis data, and a data adjustment factor; and an axial measurement distribution generator that calculates an axial measurement distribution in the nuclear fuel on the basis of the measurement values that are measured by the detectors and the reconstruction parameter that is generated by the reconstruction parameter generator.

Accordingly, the reconstruction parameter is generated on the basis of the core design data, or the core analysis data, and the data adjustment factor and the axial measurement distribution in the nuclear fuel is calculated on the basis of the measurement values measured by the detectors and the reconstruction parameter. For this reason, it is possible to specify the shape of the distribution of measurements along the axial direction by using the core design data, or the core analysis data, and the data adjustment factor and it is possible to align the reconstruction parameter with each measurement value by using the measurement values. As a result, it is possible to obtain an accurate axial measurement distribution in the nuclear fuel by reconstructing the measurement values.

According to the device for reconstructing axial measurement values in a nuclear fuel on this invention, the axial measurement distribution generator calculates the axial measurement distribution in the nuclear fuel by correcting the reconstruction parameter in accordance with the measurement values such that the deviation between the measurement values and the reconstruction parameter is at minimum.

Accordingly, because the reconstruction parameter is corrected in accordance with each measurement value, it is possible to calculate an accurate axial measurement distribution.

According to the device for reconstructing axial measurement values in a nuclear fuel on this invention, the reconstruction parameter generator generates the reconstruction parameter on the basis of an inclination adjustment factor, an axial distribution adjustment factor, and an integral value adjustment factor that serve as the data adjustment factor.

Accordingly, by using the inclination adjustment factor, the axial distribution adjustment factor, and the integral value adjustment factor as the data adjustment factor, it is possible to correct the core design data or the core analysis data to the distribution along its inclination direction and axial direction and the magnitude in along the direction of the absolute value and it is possible to generate a reconstruction parameter with accuracy.

According to the device for reconstructing axial measurement values in a nuclear fuel on this invention, the axial distribution adjustment factor is comprised of a plurality of adjustment factors that make adjustment with different periods.

Accordingly, it is possible to generate the reconstruction parameter with accuracy by using the adjustment factors that make adjustment with different periods as the axial distribution adjustment factor.

According to a method of reconstructing axial measurement values in a nuclear fuel on this invention, the method being a method of calculating an axial measurement distribution by reconstructing a plurality of measurement values measured by a plurality of detectors that are disposed at predetermined intervals in the nuclear fuel along the axial direction of the nuclear fuel. The method comprising: a step of generating a reconstruction parameter on the basis of core design data, or core analysis data, and a data adjustment factor; and a step of calculating an axial measurement distribution in the nuclear fuel on the basis of the measurement values that are measured by the detectors and the generated reconstruction parameter.

Accordingly, it is possible to specify the shape of the distribution of measurements along the axial direction by using the core design data, or the core analysis data, and the data adjustment factor and it is possible to align the reconstruction parameter with each measurement value by using the measurement values. As a result, it is possible to obtain an accurate axial measurement distribution in the nuclear fuel by reconstructing the measurement values.

Advantageous Effects of Invention

According to the device for and method of reconstructing axial measurement values in a nuclear fuel, because the reconstruction parameter is generated on the basis of the core design data, or the core analysis data and the data adjustment factor and the axial measurement distribution in the nuclear fuel is calculated on the basis of the measurement values measured by the detectors and the reconstruction parameter that is generated by the reconstruction parameter generator, it is possible to obtain the accurate axial measurement distribution in the nuclear fuel.

DESCRIPTION OF EMBODIMENTS

With reference to the accompanying drawings, a preferred embodiment of the device for and method of reconstructing axial measurement values in a nuclear fuel according to the present invention will be described in detail below. The embodiment does not limit the invention. If there are multiple embodiments, a configuration obtained by combining each embodiment may be covered.

Figure 1:
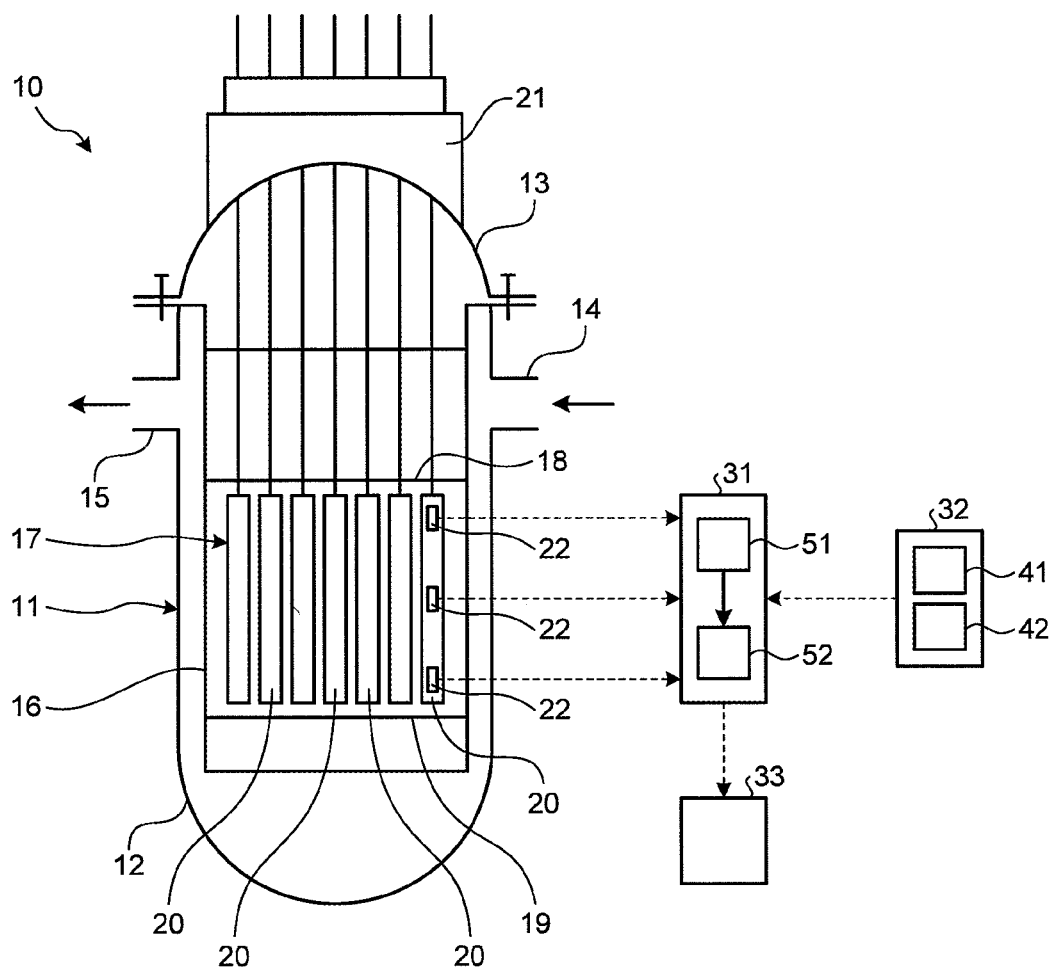
FIG. 1 is a schematic diagram illustrating a configuration of a nuclear reactor employing a device for reconstructing axial measurement values in a nuclear fuel according to an embodiment.
Figure 2:
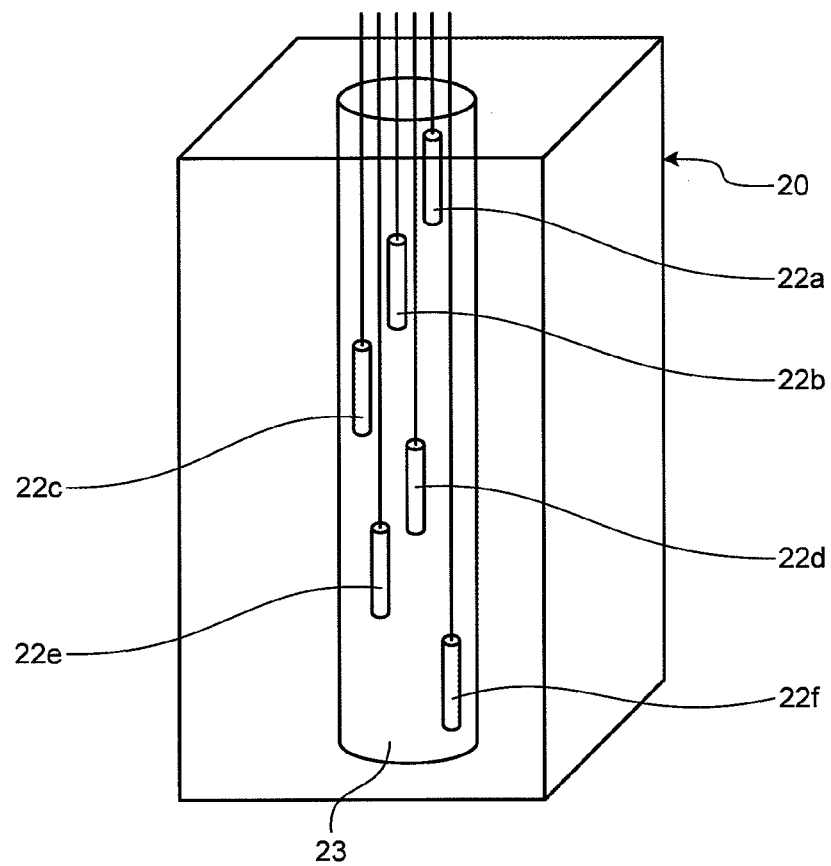
FIG. 2 is a schematic diagram illustrating disposition of neutron flux detectors in a fuel assembly.

FIG. 1 is a schematic diagram illustrating a configuration of a nuclear reactor employing a device for reconstructing axial measurement value in a nuclear fuel according to the embodiment. FIG. 2 is a schematic diagram illustrating disposition of neutron flux detectors in a fuel assembly.

Although not illustrated, a nuclear power plant includes, a nuclear reactor, a steam generator, and a steam turbine generation facilities that are disposed in a reactor vessel. The nuclear reactor according to the embodiment is a pressurized water reactor (PWR) that uses light water as a reactor cooling material and a neutron moderator, uses the light water as high-temperature and high-pressure water that does not boil in the entire core, generates vapor by heat exchange by transmitting the high-temperature and high-pressure water to the vapor generator, and generates power by transmitting the vapor to the turbine.

The nuclear reactor heats primary cooling water by nuclear fission of the fuel and the vapor generator performs heat exchange between the high-temperature and high-pressure primary cooling water and secondary cooling water to generate vapor. The vapor turbine power facility generates power by driving the vapor turbine with the vapor. On the other hand, the vapor that has driven the vapor turbine is cooled by the condenser to be condensed water and the condensed water is returned to the vapor generator.

As shown in FIG. 1, in a pressurized water reactor 10, a reactor vessel 11 is comprised of a reactor vessel body 12 and a reactor vessel lid (top mirror) 13 that is mounted on the top of the reactor vessel body 12 and the reactor vessel lid 13 is fixed to the reactor vessel body 12 with a plurality of stud bolts and nuts such that the reactor vessel lid 13 is openable and closable.

The reactor vessel body 12 has a shape of a cylinder having a closed bottom and an upper part in which an inlet nozzle (inlet tube table) 14 for supplying light water (cooling material) serving as primary cooling water and an outlet nozzle (outlet tube table) 15 for discharging the light water are formed. In the reactor vessel body 12, a core barrel 16 is disposed and the upper part of the core barrel 16 is supported by the inner wall surface of the reactor vessel body 12. A core 17 is configured by disposing a large number of fuel assemblies 20 serving as a nuclear fuel in an area sectioned by an upper core plate 18 and a lower core plate 19 in the core barrel 16. The fuel assembly 20 is configured by bundling a plurality of fuel rods (not shown) along the vertical direction to form a grid. In the core 17, a large number of control rods (not shown) are disposed in the fuel assembly 20 and a control rod drive device 21 inserts/extracts the control rods into/from the core 17 to control the reactor output.

In the fuel assembly 20, a plurality of neutron flux detectors 22 are disposed. As shown in FIGS. 1 and 2, the fuel assemblies 20 are disposed along the vertical direction and an in-core nuclear instrumentation guide thimble 23 is inserted from the top (or the bottom) between the fuel rods, and a plurality of (six according to the embodiment) neutron flux detectors 22 (22a, 22b, 22c, 22d, 22e, and 22f) are disposed in the in-core nuclear instrumentation guide thimble 23. The neutron flux detectors 22 (22a, 22b, 22c, 22d, 22e, and 22f) are disposed in the in-core nuclear instrumentation guide thimble 23 at predetermined intervals (preferably at constant intervals) in the axial direction of the fuel assembly 20 (fuel rods) (vertical direction). The neutron flux detectors 22 (22a, 22b, 22c, 22d, 22e, and 22f) detect the neutron flux of the core and outputs a signal proportional to the value of the output of the core 17. Accordingly, it is possible to calculate an axial output distribution (axial reaction rate distribution) serving as an axial measurement distribution in the core 17 on the basis of the output signals from the respective neutron flux detectors 22 (22a, 22b, 22c, 22d, 22e, and 22f).

It is however difficult to obtain an accurate axial output distribution in the fuel assembly 20 because only the six neutron flux detectors 22 (22a, 22b, 22c, 22d, 22e, and 22f) are disposed in the fuel assembly 20 along its axial direction. Furthermore, when any one of the six neutron flux detectors 22 (22a, 22b, 22c, 22d, 22e, and 22f) fails, the number of measurement values decreases, which further lowers the accuracy of the axial output distribution.

According to the embodiment, an accurate axial output distribution (axial response rate distribution) is calculated by reconstructing the measurement values (output signals) measured by the neutron flux detectors 22 (22a, 22b, 22c, 22d, 22e, and 22f).

As shown in FIG. 1, the device for reconstructing axial measurement values in a nuclear fuel according to the embodiment is a device for reconstructing axial measurement values in a nuclear fuel that calculates an axial measurement distribution (hereinafter, axial reaction rate distribution) by reconstructing a plurality of measurement values measured by the neutron flux detectors 22 (22a, 22b, 22c, 22d, 22e, and 22f) that are disposed in the fuel assembly 20 at predetermined intervals in the fuel assembly 20 in its axial direction, and the device is comprised of a data processor 31, a data storage unit 32, and a data output unit 33.

The data storage unit 32 is comprised of a core design/analysis data storage unit 41 that stores core design data and core analysis data and a data adjustment factor storage unit 42 that stores various data adjustment factors to be described below. The data processor 31 is comprised of a reconstruction parameter generator 51 that generates a reconstruction parameter on the basis of the core design data, or the core analysis data, and the data adjustment factors and an axial reaction rate distribution generator (an axial measurement distribution generator) 52 that calculates an axial reaction rate distribution in the fuel assembly 20 on the basis of the measurement values measured by the neutron flux detectors 22 (22a, 22b, 22c, 22d, 22e, and 22f) and the reconstruction parameter generated by the reconstruction parameter generator 51. The data output unit 33 is a display, a printer, or the like that outputs the axial reaction rate distribution that is generated by the axial reaction rate distribution generator 52.

The axial reaction rate distribution generator 52 calculates an axial reaction rate distribution in the fuel assembly 20 by correcting the reconstruction parameter in accordance with the measurement values such that the deviation between the measurement values and the reconstruction parameter is at minimum.

The reconstruction parameter generator 51 generates a reconstruction parameter on the basis of an inclination adjustment factor, an axial distribution adjustment factor, and an integral value adjustment factor serving as the data adjustment factors. The axial distribution adjustment factors are comprised of a plurality of adjustment factors that make adjustments with different periods.

Figure 3:
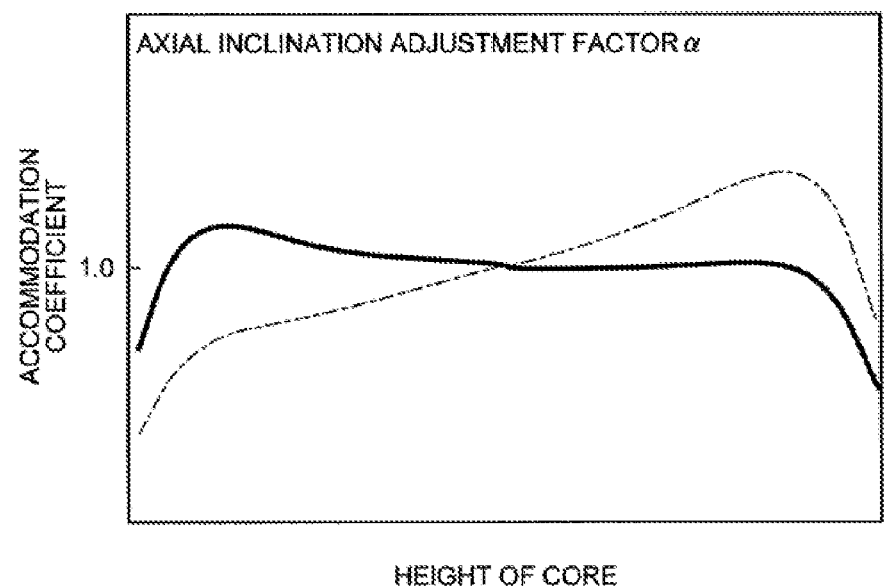
FIG. 3 is a graph representing an axial inclination adjustment factor α.
Figure 4:
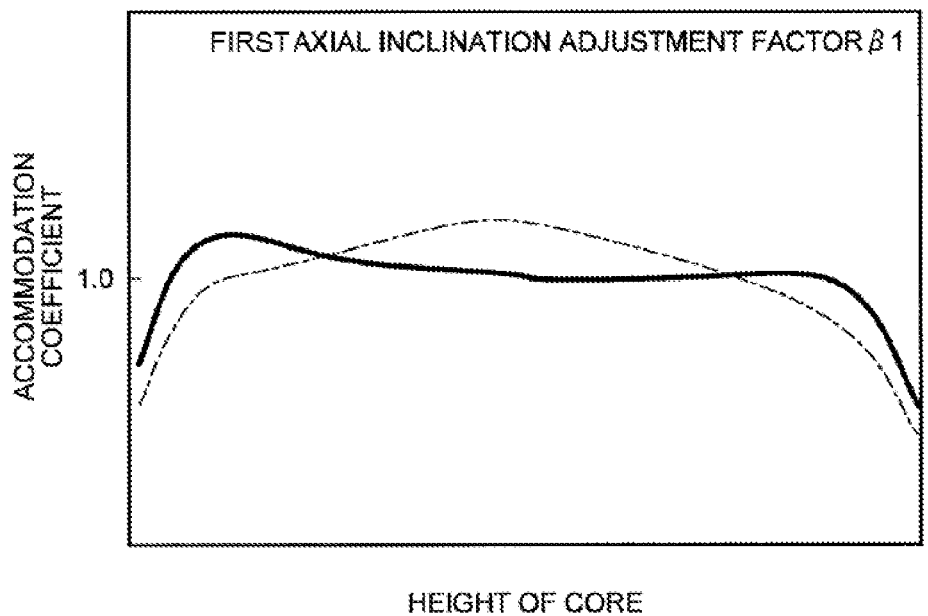
FIG. 4 is a graph representing a first axial distribution adjustment factor β1.
Figure 5:
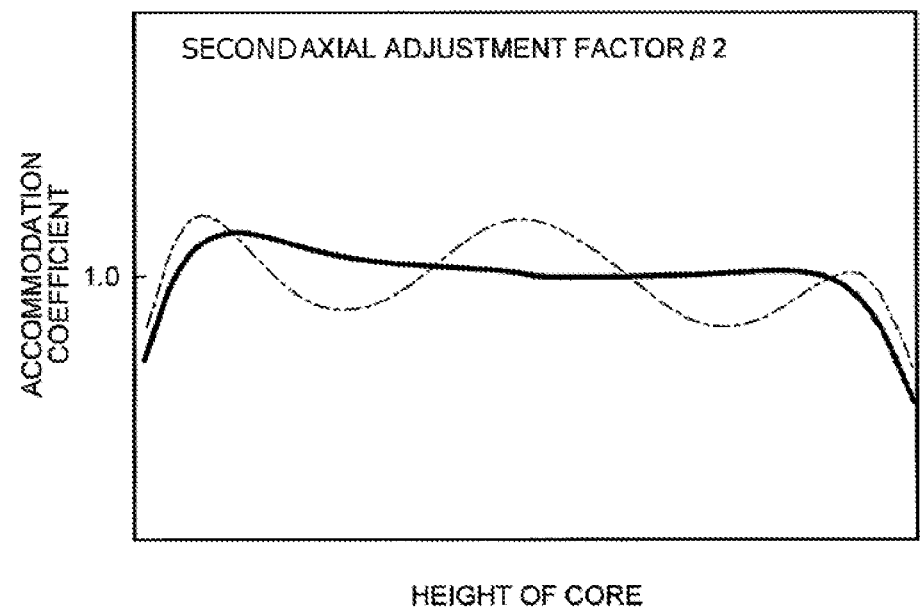
FIG. 5 is a graph representing a second axial distribution adjustment factor β2.
Figure 6:
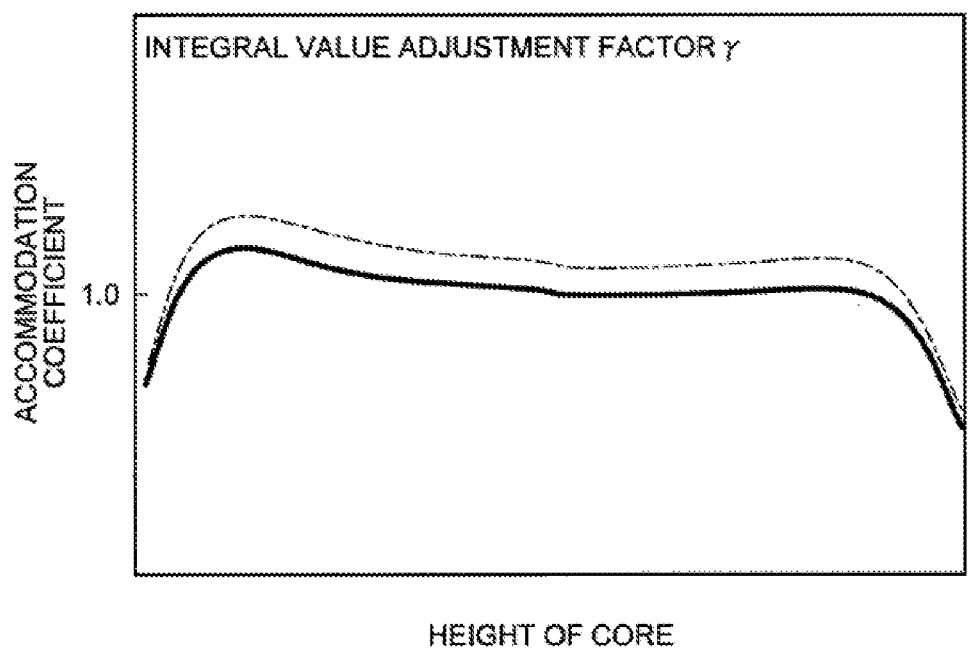
FIG. 6 is a graph representing an integral value adjustment factor γ.
Figure 7:
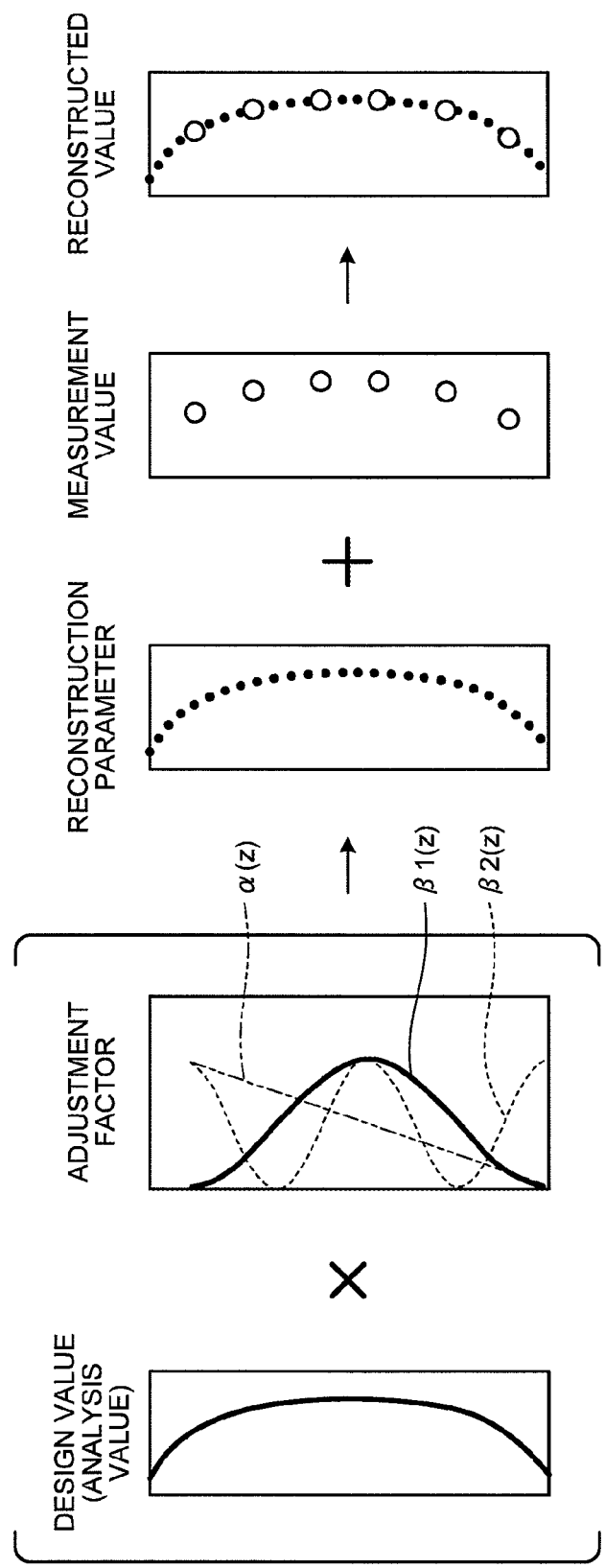
FIG. 7 is a schematic diagram illustrating a method of reconstructing axial measurement values in the nuclear fuel.

The method of reconstructing axial measurement values, which is a method performed by the device for reconstructing axial measurement values in a nuclear fuel will be described in detail here. FIG. 3 is a graph representing an axial inclination adjustment factor $\alpha$, FIG. 4 is a graph representing a first axial distribution adjustment factor $\beta 1$, FIG. 5 is a graph representing a second axial distribution adjustment factor $\beta 2$, FIG. 6 is a graph representing an integral value adjustment factor $\gamma$, and FIG. 7 is a schematic diagram illustrating the method of reconstructing axial measurement values in a nuclear fuel.

In the data storage unit 32, the core design/analysis data storage unit 41 stores the core design data and the core analysis data. As shown in FIG. 7, the core design data is data on design values of reaction rates (horizontal axis) with respect to the height of the core (vertical axis) at the time when the core is designed. The core analysis data is data on analysis values of reaction rates (horizontal axis) with respect to the height of the core (vertical axis) after a predetermined period from when the core is designed. In other words, the core design data is an axial distribution of reaction rates at the time when the core is designed and the analysis data is the axial distribution of reaction rates obtained by analyzing the core after the predetermined period from when the core is designed.

In the data storage unit 32, the data adjustment factor storage unit 42 stores data adjustment factors. The axial inclination adjustment factor $\alpha$, the axial distribution adjustment factors $\beta$ (the first axial distribution adjustment factors $\beta 1$ and the second axial distribution adjustment factor $\beta 2$), and the integral value adjustment factor $\gamma$ are set as the data adjustment factors.

As shown in FIG. 3, the axial inclination adjustment factor $\alpha$ represented by the dashed line is an accommodation coefficient with respect to the height of the core (horizontal axis), which is an accommodation coefficient to correct an inclination of the design values (analysis values) represented by the solid line with respect to the axial direction. As shown in FIG. 4, the first axial distribution adjustment factor $\beta 1$ represented by the dashed line is an accommodation coefficient with respect to the height of the core (horizontal axis), which is an accommodation coefficient to correct a primary period of the design values (analysis values) represented by the solid line with respect to the axial direction. As shown in FIG. 5, the second axial distribution adjustment factor $\beta 2$ represented by the dashed line is an accommodation coefficient with respect to the height of the core (horizontal axis), which is an accommodation coefficient to correct a secondary period of the design values (analysis values) represented by the solid line with respect to the axial direction. As shown in FIG. 6, the integral value adjustment factor $\gamma$ represented by the dashed line is an accommodation coefficient with respect to the height of the core (horizontal axis), which is an accommodation coefficient to correct the magnitude (absolute value) of the design values (analysis values) represented by the solid line.

In the data processor 31, as shown in FIGS. 1 and 7, the reconstruction parameter generator 51 generates a reconstruction parameter on the basis of the core design data (core analysis data) and the four data adjustment factors. In other words, supposing that the reconstruction parameter is $RR^a_{(z)}$, the core design data (core analysis data) is $RR^c_{(z)}$, the axial inclination adjustment factor is $\alpha_{(z)}$, the axial distribution adjustment factor is $\beta_{(z)}$, and the integral value adjustment factor is $\gamma_{(z)}$, a reconstruction parameter $RR^a_{(z)}$ can be calculated according to the following Equation (1).

$$RR^a_{(z)} = RR^c_{(z)} \times \left(1 + \frac{\alpha(z)}{100}\right) \times \left(1 + \frac{\beta(z)}{100}\right) \times \gamma_{(z)} \quad (1)$$

The axial inclination adjustment factor $\alpha_{(z)}$ and the axial distribution adjustment factor $\beta_{(z)}$ can be calculated according to the following Equation (2) and Equation (3), where H is the height of the core (effective height), z is the level at which measurement is performed by the neutron flux detector 22a, 22b, 22c, 22d, 22e, or 22f, and a is a variable for determining the axial inclination adjustment factor α, b1 and b2 are variables for determining each of the axial distribution adjustment factors β1 and β2, and n is a period.

$$\alpha(z) = a \times \left(\frac{z - \frac{H}{2}}{\frac{H}{2}}\right) \quad (2)$$

$$\beta(z) = b_1 \cdot \cos\left(\pi \frac{z - \frac{H}{2}}{\frac{H}{2}}\right) + b_2\left(2\pi \frac{z - \frac{H}{2}}{\frac{H}{2}}\right) \quad (3)$$

When the reconstruction parameter generator 51 generates a reconstruction parameter, the axial reaction rate distribution generator 52 calculates an axial reaction rate distribution in the fuel assembly 20 on the basis of the measurement values measured by the neutron flux detectors 22 (22a, 22b, 22c, 22d, 22e, and 22f) and the reconstruction parameter. In other words, the reconstruction parameter only represents a variation in the reaction rate with respect to the axial direction (direction along the height) of the fuel assembly 20 and its magnitude is not enough. For this reason, by superimposing the reconstruction parameter onto the measurement values measured by the respective neutron flux detectors 22 (22a, 22b, 22c, 22d, 22e, and 22f) and correcting the reconstruction parameter in accordance with each measurement value to minimize the deviation between each measurement value and the reconstruction parameter, it is possible to calculate an axial reaction rate distribution (reconstructed values) in the fuel assembly 20.

Figure 8:
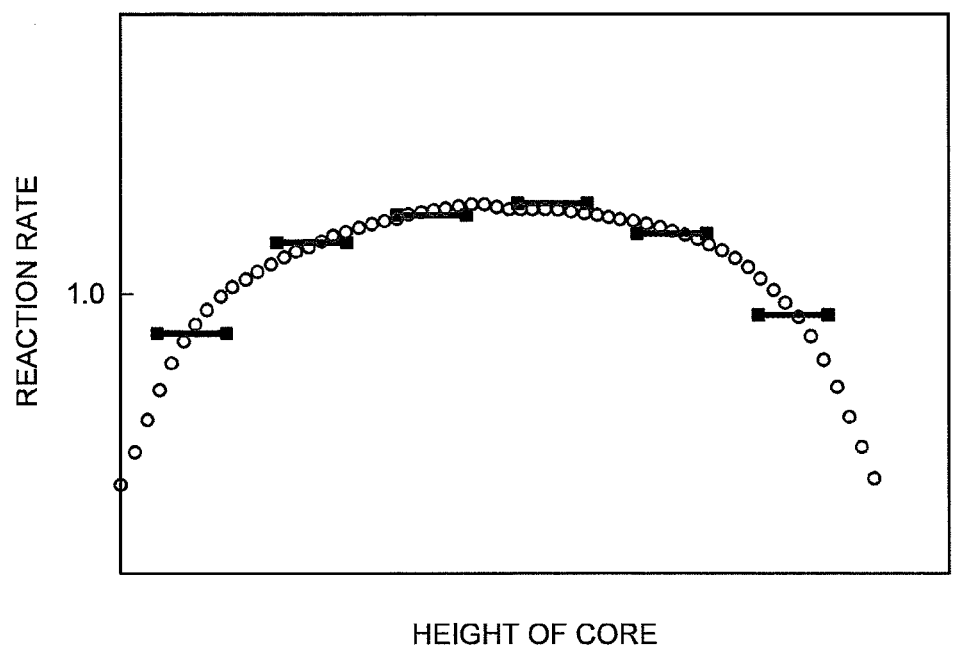
FIG. 8 is a graph representing a result of reconstructing axial measurement values in the nuclear fuel.
Figure 9:
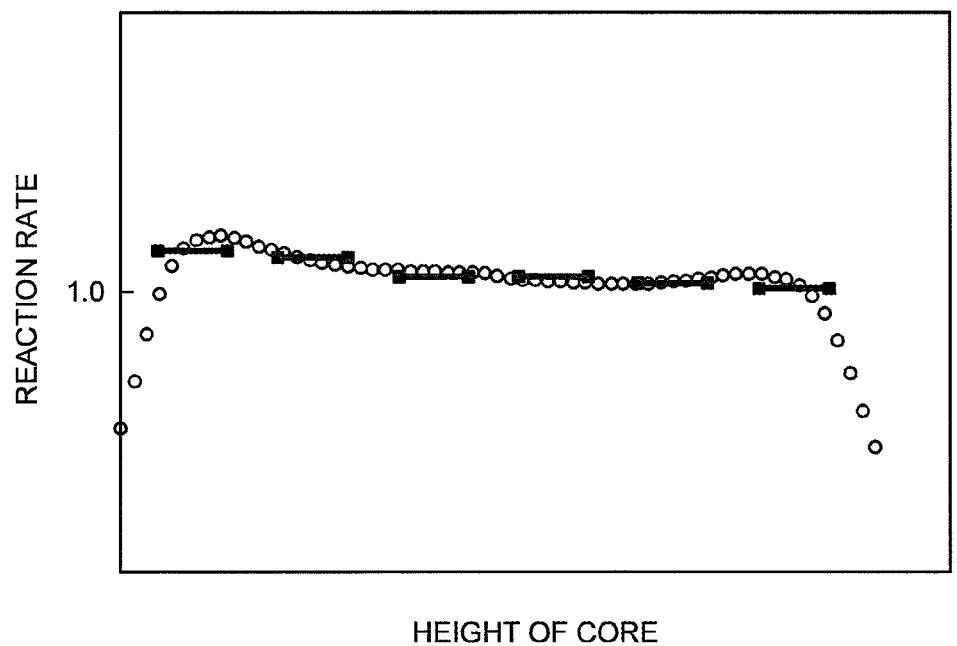
FIG. 9 is a graph representing a result of reconstructing axial measurement values in the nuclear fuel.
Figure 10:
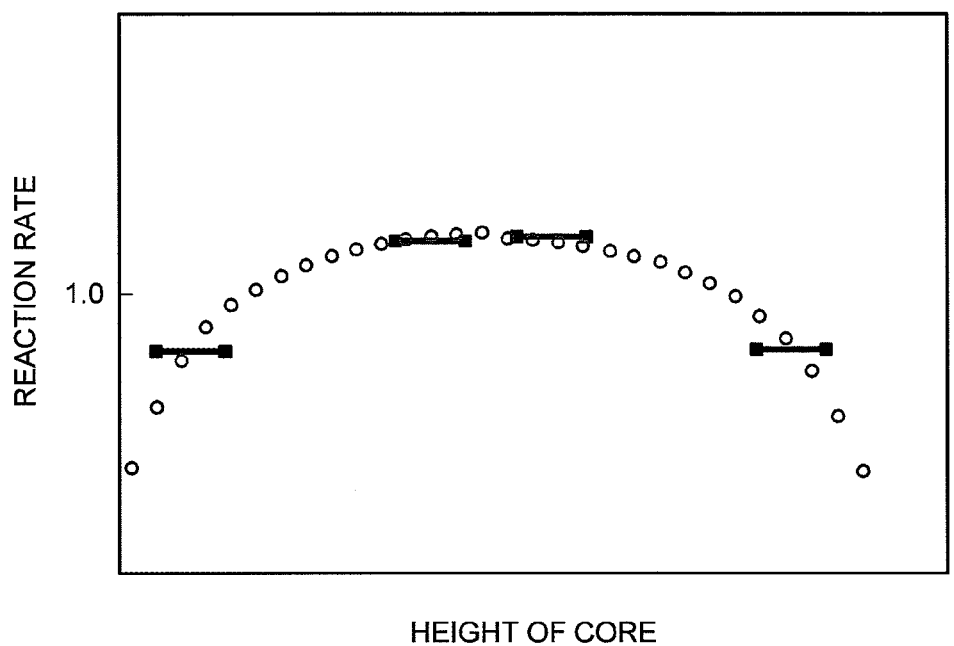
FIG. 10 is a graph representing a result of reconstructing axial measurement values in the nuclear fuel obtained when part of the neutron fuel detectors fails.
Figure 11:
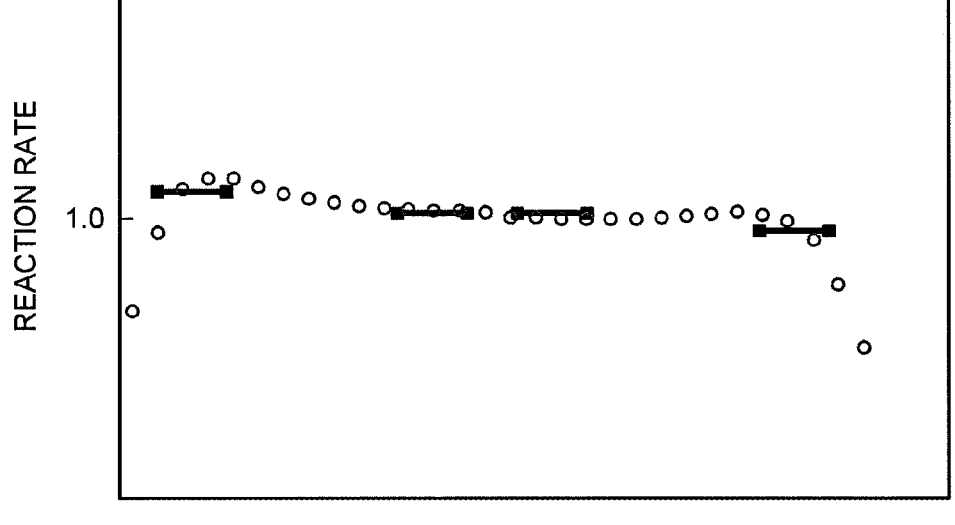
FIG. 11 is a graph representing a result of reconstructing axial measurement values in the nuclear fuel obtained when part of the neutron fuel detectors fails.

FIGS. 8 and 9 are graphs representing results of reconstructing axial measurement values in the nuclear fuel and FIGS. 10 and 11 are graphs representing results of reconstructing axial measurement values in the nuclear fuel obtained when part of the neutron fuel detectors fails.

In FIGS. 8 and 9, "-" represents values measured by the neutron flux detectors 22a, 22b, 22c, 22d, 22e, and 22f and "○" represents reconstructed values. FIG. 8 represents data at the time when the core is designed and FIG. 9 is data after the predetermined period from when the core is designed. As understood from FIGS. 8 and 9, it is understood that values "-" measured by the neutron flux detectors 22a, 22b, 22c, 22d, 22e, and 22f and the reconstructed values "○" generated according to the embodiment approximately coincide.

Furthermore, as shown in FIGS. 10 and 11, even when the neutron flux detectors 22b and 22e that are part of the neutron flux detectors fail, it is understood that values "-" measured by the neutron flux detectors 22a, 22c, 22d, and 22f and the reconstructed values "○" generated according to the embodiment approximately coincide.

As for the device for reconstructing axial measurement values in a nuclear fuel according to the embodiment, a device for reconstructing axial measurement values in a nuclear fuel, which is a device that calculates an axial reaction rate distribution by reconstructing a plurality of measurement values measured by a plurality of neutron flux detectors 22 (22a, 22b, 22c, 22d, 22e and 22f) that are disposed at predetermined intervals in a fuel assembly 20 along the axial direction of the fuel assembly 20, is provided with: a reconstruction parameter generator 51 that generates a reconstruction parameter on the basis of core design data, or core analysis data, and a data adjustment factor; and an axial reaction rate distribution generator 52 that calculates an axial reaction rate distribution on the basis of the measurement values that are measured by the neutron flux detectors 22 (22a, 22b, 22c, 22d, 22e and 22f) and the reconstruction parameter that is generated by the reconstruction parameter generator 51.

Accordingly, the reconstruction parameter is generated on the basis of the core design data, or the core analysis data, and the data adjustment factor and the axial reaction rate distribution is calculated on the basis of the measurement values measured by the neutron flux detectors 22 (22a, 22b, 22c, 22d, 22e and 22f) and the reconstruction parameter. Accordingly, it is possible to specify the shape of the distribution of reaction rates along the axial direction by using the core design data, or the core analysis data, and the data adjustment factor, and it is possible to align the reconstruction parameter with each measurement value by using the measurement values. As a result, it is possible to obtain an axial reaction rate distribution in the fuel assembly 20 by reconstructing the measurement values.

According to the device for reconstructing axial measurement values in a nuclear fuel according to the embodiment, the axial reaction rate distribution is calculated by correcting the reconstruction parameter in accordance with the measurement values such that the deviation between the measurement values and the reconstruction parameter is at minimum. Accordingly, because the reconstruction parameter is corrected in accordance with each measurement value, it is possible to calculate an accurate axial measurement distribution.

According to the device for reconstructing axial measurement values in a nuclear fuel according to the embodiment, the reconstruction parameter generator 51 generates the reconstruction parameter on the basis of an inclination adjustment factor, an axial distribution adjustment factor, and an integral value adjustment factor that serve as the data adjustment factor. Furthermore, the multiple adjustment factors that make adjustment with different periods are used as the axial distribution adjustment factor. Accordingly, it is possible to correct the core design data or the core analysis data to the distribution along its inclination direction and axial direction and the magnitude in along the direction of the absolute value and it is possible to generate a reconstruction parameter with accuracy.

Furthermore, the method of reconstructing axial measurement values in a nuclear fuel according to the embodiment includes: a step of generating a reconstruction parameter on the basis of e core design data, or core analysis data, and a data adjustment factor, and a step of calculating an axial reaction rate distribution on the basis of measurement values measured by the neutron flux detectors 22 (22a, 22b, 22c, 22d, 22e and 22f) and the generated reconstruction parameter.

Accordingly, it is possible to specify the shape of the distribution of reaction rates along the axial direction by using the core design data, or the core analysis data, and the data adjustment factor, and it is possible to align the reconstruction parameter with each measurement value by using the measurement values. As a result, it is possible to obtain an accurate axial reaction rate distribution in the fuel assembly 20.

According to the above-described embodiment, the axial reaction rate distribution is calculated as the axial measurement distribution; however, an axial output distribution may be calculated. Furthermore, replacing the neutron flux detectors with temperature detectors enables the detectors to calculate an axial temperature distribution.

REFERENCE SIGNS LIST

10 PRESSURIZED WATER RECTOR
17 CORE
22, 22a, 22b, 22c, 22d, 22e, 22f NEUTRON FLUX DETECTOR
23 IN-CORE NUCLEAR DESIGN GUIDE THIMBLE
31 DATA PROCESSOR
32 DATA STORAGE UNIT
33 DATA OUTPUT UNIT
41 CORE DESIGN ANALYSIS DATA STORAGE UNIT
42 DATA ADJUSTMENT FACTOR STORAGE UNIT
51 RECONSTRUCTION PARAMETER GENERATOR
52 AXIAL RESPONSE RATE DISTRIBUTION GENERATOR (AXIAL MEASUREMENT DISTRIBUTION GENERATOR)

The invention claimed is:

1. A device configured for reconstructing axial measurement values in a nuclear fuel, the device calculating an axial measurement distribution by reconstructing a plurality of measurement values measured by a plurality of detectors that are disposed at predetermined intervals in the nuclear fuel along the axial direction of the nuclear fuel, the device comprising:

a processor that includes
a reconstruction parameter generator configured to generate a reconstruction parameter on the basis of core design data, or core analysis data, and a data adjustment factor; and
an axial measurement distribution generator configured to calculate an axial measurement distribution in the nuclear fuel on the basis of the measurement values that are measured by the detectors and the reconstruction parameter that is generated by the reconstruction parameter generator,
wherein the data adjustment factors are an inclination adjustment factor, an axial distribution adjustment factor, and an integral value adjustment factor.

2. The device for reconstructing axial measurement values in a nuclear fuel according to claim 1, wherein
the axial measurement distribution generator calculates the axial measurement distribution in the nuclear fuel by correcting the reconstruction parameter in accordance with the measurement values such that the deviation between the measurement values and the reconstruction parameter is at minimum.

3. The device for reconstructing axial measurement values in a nuclear fuel according to claim 1 wherein
the axial distribution adjustment factor is comprised of a plurality of adjustment factors for making adjustment with different periods.

4. A method of reconstructing axial measurement values in a nuclear fuel, the method being a method of calculating an axial measurement distribution by reconstructing a plurality of measurement values measured by a plurality of detectors that are disposed at predetermined intervals in the nuclear fuel along the axial direction of the nuclear fuel, the method comprising:
a step of generating a reconstruction parameter on the basis of core design data, or core analysis data, and data adjustment factors; and
a step of calculating an axial measurement distribution in the nuclear fuel on the basis of the measurement values that are measured by the detectors and the generated reconstruction parameter,
wherein the reconstruction parameter is generated on the basis of an inclination adjustment factor, an axial distribution adjustment factor, and an integral value adjustment factor that serve as the data adjustment factors.

* * * * *